(12) United States Patent
Yasukawa

(10) Patent No.: US 8,949,039 B2
(45) Date of Patent: Feb. 3, 2015

(54) PREDICTION APPARATUS, PREDICTION SYSTEM, IMAGE FORMING APPARATUS, MEDIUM TRANSPORTER, AND COMPUTER READABLE MEDIUM

(75) Inventor: Kaoru Yasukawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 856 days.

(21) Appl. No.: 13/013,175

(22) Filed: Jan. 25, 2011

(65) Prior Publication Data

US 2012/0053850 A1 Mar. 1, 2012

(30) Foreign Application Priority Data

Aug. 25, 2010 (JP) .................................. 2010-187885

(51) Int. Cl.
*B65H 5/06* (2006.01)
*G03G 15/00* (2006.01)
*B65H 7/00* (2006.01)
*H04N 1/00* (2006.01)

(52) U.S. Cl.
CPC .................. *B65H 7/00* (2013.01); *B65H 5/062* (2013.01); *H04N 1/00007* (2013.01); *H04N 1/00042* (2013.01); *H04N 1/0005* (2013.01); *H04N 1/00063* (2013.01); *H04N 1/00068* (2013.01); *H04N 1/00074* (2013.01); *H04N 1/0009* (2013.01); *H04N 1/00745* (2013.01); *H04N 1/00766* (2013.01); *H04N 1/00771* (2013.01); *B65H 2404/14* (2013.01); *B65H 2513/10* (2013.01); *B65H 2513/53* (2013.01); *B65H 2515/842* (2013.01); *B65H 2801/06* (2013.01)
USPC .......................................................... 702/34

(58) Field of Classification Search
CPC ........................ B65H 2513/50; G03G 15/6564

USPC ................................................................. 702/34
See application file for complete search history.

(56) References Cited

U.S. PATENT DOCUMENTS

| | | | | |
|---|---|---|---|---|
| 4,362,370 A | * | 12/1982 | Iwata et al. | 396/407 |
| 5,540,426 A | * | 7/1996 | Nakamura et al. | 271/265.01 |
| 6,282,403 B1 | * | 8/2001 | Spencer et al. | 399/406 |
| 2003/0019885 A1 | * | 1/2003 | Luehrsen et al. | 222/94 |
| 2003/0173736 A1 | * | 9/2003 | Yano | 271/264 |
| 2005/0050423 A1 | * | 3/2005 | Yasukawa et al. | 714/742 |
| 2006/0202409 A1 | * | 9/2006 | Yasui et al. | 271/258.01 |

FOREIGN PATENT DOCUMENTS

| | | |
|---|---|---|
| JP | A-07-33276 | 2/1995 |
| JP | A 2003-261237 | 9/2003 |
| JP | A 2008-158051 | 7/2008 |

OTHER PUBLICATIONS

Notification of the First Office Action issued in Chinese Patent Application No. 201110040557.4 (with English translation).

* cited by examiner

*Primary Examiner* — Jonathan C Teixeira Moffat
*Assistant Examiner* — Regis Betsch
(74) *Attorney, Agent, or Firm* — Oliff PLC

(57) ABSTRACT

A prediction apparatus includes: an acquisition unit that acquires an operation amount and a non-operation amount of a transporting unit that transports a medium; and a prediction unit that predicts a timing at which a transporting capability value changing with degradation of the transporting unit arrives at a threshold value using the operation amount and the non-operation amount of the transporting unit acquired by the acquisition unit based on (i) a relational expression between the operation amount of the transporting unit and the transporting capability value of the transporting unit and (ii) a relational expression between the non-operation amount of the transporting unit and the transporting capability value of the transporting unit.

20 Claims, 13 Drawing Sheets

FIG. 4

| ELAPSED TIME | ROLL OPERATION TIME | ROLL NON-OPERATION TIME | SHEET TRANSPORT- ING TIME |
|---|---|---|---|
| $R_0$ | — | — | — |
| $R_1$ | $O_1$ | $NO_1 \ (= R_1 - R_0 - O_1)$ | $T_1$ |
| $R_2$ | $O_2$ | $NO_2 \ (= R_2 - R_1 - O_2)$ | $T_2$ |
| $R_3$ | $O_3$ | $NO_3 \ (= R_3 - R_2 - O_3)$ | $T_3$ |
| ⋮ | ⋮ |  | ⋮ |
| ⋮ | ⋮ |  | ⋮ |
| $R_{k-1}$ | $O_{k-1}$ | $NO_{k-1} \ (= R_{k-1} - R_{k-2} - O_{k-1})$ | $T_{k-1}$ |
| $R_k$ | $O_k$ | $NO_k \ (= R_k - R_{k-1} - O_k)$ | $T_k$ |

PREDICTION APPARATUS, PREDICTION SYSTEM, IMAGE FORMING APPARATUS, MEDIUM TRANSPORTER, AND COMPUTER READABLE MEDIUM

CROSS-REFERENCE TO RELATED APPLICATION

This application is based on and claims priority under 35 USC 119 from Japanese Patent Application No. 2010-187885 filed on Aug. 25, 2010.

BACKGROUND

1. Technical Field

This invention relates to a prediction apparatus, a prediction system, an image forming apparatus, a medium transporter, and a computer readable medium.

2. Related Art

Hitherto, prediction concerning a fault involved in a transporting system has been conducted to realize prevention of occurrence of a fault such as a paper jam in the transporting system for transporting a medium of a sheet, etc., in an image forming apparatus.

SUMMARY

According to an aspect of the invention, a prediction apparatus includes: an acquisition unit that acquires an operation amount and a non-operation amount of a transporting unit that transports a medium; and a prediction unit that predicts a timing at which a transporting capability value changing with degradation of the transporting unit arrives at a threshold value using the operation amount and the non-operation amount of the transporting unit acquired by the acquisition unit based on (i) a relational expression between the operation amount of the transporting unit and the transporting capability value of the transporting unit and (ii) a relational expression between the non-operation amount of the transporting unit and the transporting capability value of the transporting unit.

BRIEF DESCRIPTION OF THE DRAWINGS

Exemplary embodiments of the invention will be described in detail based on the following figures, wherein:

FIG. 4 is a drawing to illustrate data collected in the prediction system according to the exemplary embodiment of the invention;

DETAILED DESCRIPTION

One exemplary embodiment of the invention will be discussed with reference to the accompanying drawings.

Prediction concerning a fault relating to a transporting roll forming a part of a transporting system of a medium of a sheet, etc., on which an image is to be formed will be discussed below by taking an image forming apparatus of a printer, a copier, a facsimile machine, a multiple function device including the functions of print, copy, facsimile, etc., as an example:

First, before the description of the invention, a system for conducting prediction concerning a fault relating to a transporting roll based on the operation time of the transporting roll will be discussed as an example of prediction according to a system.

Figure 15:
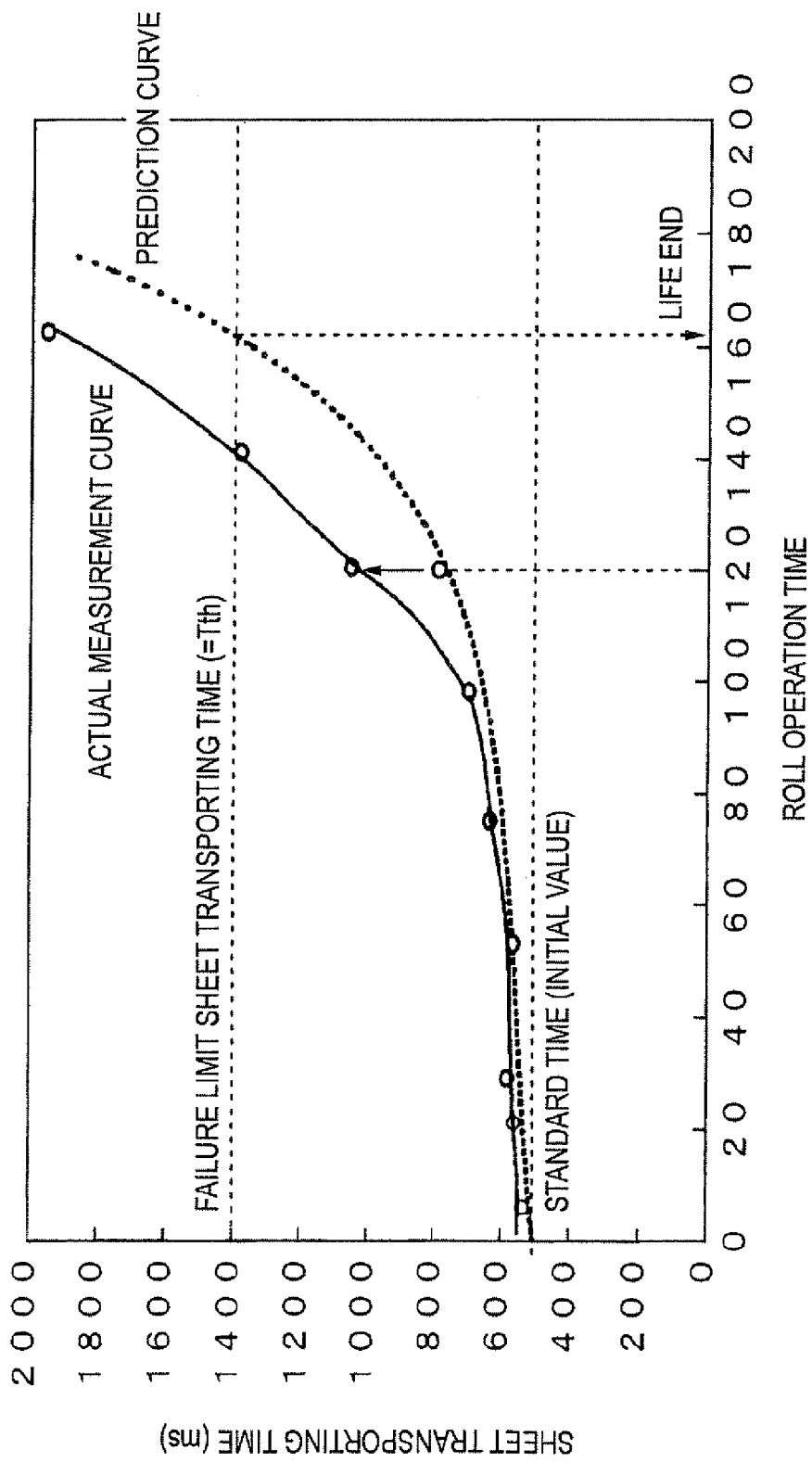
FIG. 15 is a drawing to illustrate a change in sheet transporting time accompanying an increase in the operation time of a transporting roll.

FIG. 15 illustrates a change in the sheet transporting time as the operation time of the transporting roll increases. The horizontal axis is the roll operation time representing the operation time of the transporting roll and the vertical axis is the sheet transporting time representing the time required for a sheet being transported by the transporting roll to pass through a preset interval.

In FIG. 15, a prediction curve of the sheet transporting time derived based on the measurement result when the transporting roll is experimentally used in an experimental environment is illustrated by a dotted line and it is seen that the sheet transporting time gradually increases from the standard time (initial value) as the roll operation time increases. The sheet transporting time when it is estimated that a fault of a paper jam, etc., will start to occur (or occurrence will become noticeable) is shown as failure limit sheet transporting time (=Tth), and the point in time at which the sheet transporting time reaches the failure limit sheet transporting time is found as life end (life). The "life end" means that the transporting roll reaches the limit of demonstrating the function as the transporting roll and the transporting roll needs to be replaced.

According to the system, as use of the image forming apparatus at the operation time is close to use at the test time, the prediction accuracy of the time of the life end is enhanced. However, as the actual measurement curve based on the measurement result at the operation time is illustrated by the solid line in the figure, the sheet transporting time shows a similar increase tendency to the prediction curve in the beginning, but may show a different increase tendency from the prediction curve from one time. Consequently, in the example in FIG. 15, the time of the life end found from the prediction curve is about 160 hours; while, the time of the life end found from the actual measurement curve is about 140 hours and an error of about 20 hours occurs.

The cause of occurrence of the unnegligible error as mentioned above in the prediction result in the system will be discussed.

As the main factors of a change in the sheet transporting time of a transporting roll, lowering of the transporting speed caused by wear of the transporting roll because of transporting sheets, slip caused by a change in the surface property (lowering of frictional coefficient), etc., may be named. Another factor is time-varying lowering of the frictional coefficient as the transporting roll is exposed to the ambient environment (air, etc.,). In the Specification, the degradation caused by the former factors is called wear-based degradation and the degradation caused by the latter factor is called time-varying degradation.

As described above, not only the effect of the wear-based degradation of the transporting roll, but also the effect of the time-varying degradation appears in the sheet transporting time. The prediction based on the roll operation time described in the system is modeling considering the wear-based degradation and the time-varying degradation is scarcely considered.

The reason why the time-varying degradation is scarcely considered in the system is as follows: If a stable use frequency less varying depending on the time period (it is assumed that wear-based degradation and time-varying degradation proceed at the same degree) and a prediction expression (expression representing a prediction curve) is created from the sheet transporting tune measured based on the assumption, the time-varying degradation at the assumed use frequency is reflected on the prediction expression and thus it is considered that an error caused by the time-varying degradation is small.

However, the actual use frequency of the image forming apparatus varies in response to differences in the use mode of the image forming apparatus and the use environment of the number of users, etc., and thus the time interval at which the transporting roll operates and the number of sheets transported by the transporting roll vary from one use environment to another. Thus, the progress degree of the wear-based degradation caused by transporting sheets and the progress degree of the time-varying degradation vary from one use environment to another. Specifically, for example, in a transporting roll operating every day, a transporting roll operating every week, and a transporting roll not operating over a long term of one month or more, if the numbers of transported sheets are the same (the progress degrees of the wear-based degradation are the same), but the progress degrees of the time-varying degradation differ. Therefore, the sheet transporting time measured in a use environment in which the use frequency of the image forming apparatus is different from the assumed use frequency deviates from the prediction expression, causing considerable error to occur in prediction of the time of the life end.

Then, in an embodiment of the invention, a prediction expression A for calculating a change in the sheet transporting time caused by the wear-based degradation (wear-based sheet transporting time prediction expression) and a prediction expression B for calculating a change in the sheet transporting time caused by the time-varying degradation (time-varying sheet transporting time prediction expression) are provided separately and prediction is conducted based on the two prediction expressions A and B, thereby enhancing accuracy of prediction concerning a fault relating to the transporting system.

First, prediction expression creation processing in a predication system according to one exemplary embodiment of the invention will be discussed.

Figure 1:
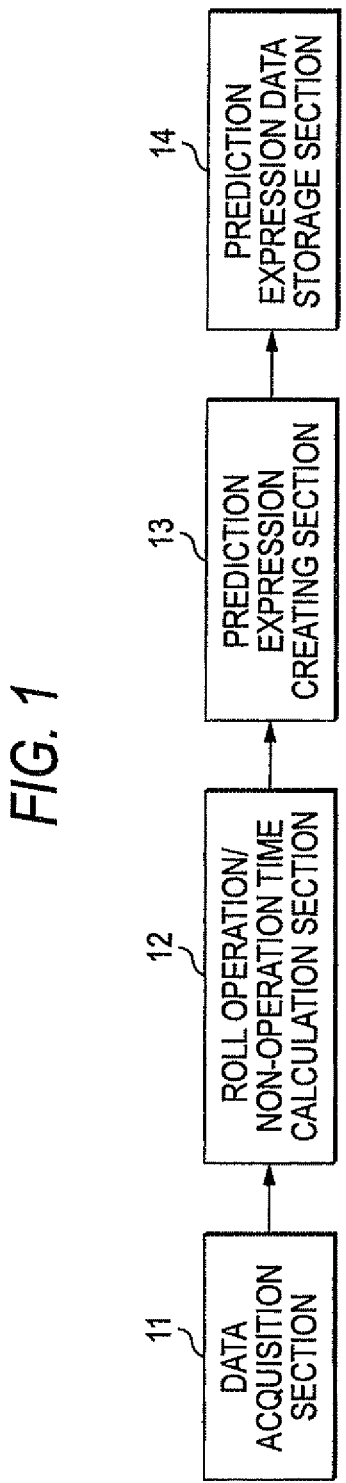
FIG. 1 is a drawing to show an example of function blocks relating to prediction expression creation processing in a prediction system according to one exemplary embodiment of the invention.

FIG. 1 shows an example of a function block relating to the prediction expression creation processing. The prediction system in the example performs the prediction expression creation processing using function sections of a data acquisition section 11, a roll operation/non-operation time calculation section 12, a prediction expression creation section 13, a prediction expression data storage section 14, etc.

The data acquisition section 11 acquires data which becomes a basis for creating expression expressions A and B from an image forming apparatus installed for an experiment. In the example, the data acquisition section 11 acquires the elapsed time from the reference date and time, the sheet transporting time required for a sheet being transported by a transporting roll to pass through a preset interval, operation state data indicating the operation state (operation or non-operation) of the transporting roll.

As the elapsed time, for example, the date and time at which the transporting roll is attached to the image forming apparatus is stored in a storage section and the time found by subtracting the reference date and time from the measurement date and time is used. The date and time at which the image forming apparatus is installed in the use environment, the date and time at which the transporting roll is manufactured, the date and time at which the transporting roll is replaced, etc., may be used as the reference date and time.

Figure 2:
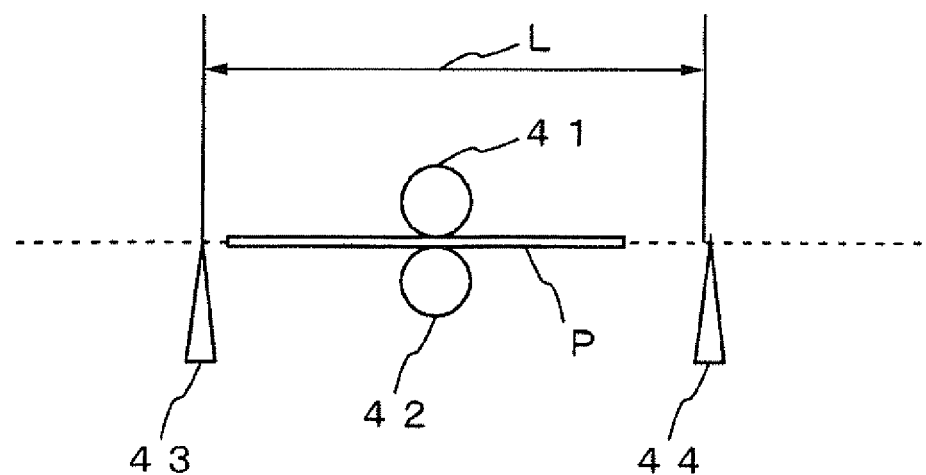
FIG. 2 is a drawing to describe a measurement example of sheet transporting time in the prediction system according to the exemplary embodiment of the invention.

As the sheet transporting time, the times measured using a plurality of detection sections are used, for example, as illustrated in FIG. 2. In the example in FIG. 2, two detection sections 43 and 44 are placed at a distance L at a midpoint of the transporting path of a sheet P transported by two transporting rolls 41 and 42 forming a transporting system, and the time difference between the time at which the detection section 43 detects passage of the leading end (or trailing end) of the sheet P and the time at which the detection section 44 detects passage of the leading end (or trailing end) of the sheet P is found and is adopted as the sheet transporting time of the transporting rolls 41 and 42.

As the operation state data, for example, a control signal issued from a control section of the image forming apparatus to a drive section (motor) of the transporting roll (for example, a drive start or drive stop command signal) is used.

The roll operation/non-operation time calculation section 12 calculates the operation time of the transporting roll (roll operation time) and the non-operation time of the transporting roll (roll non-operation time).

Figure 3:
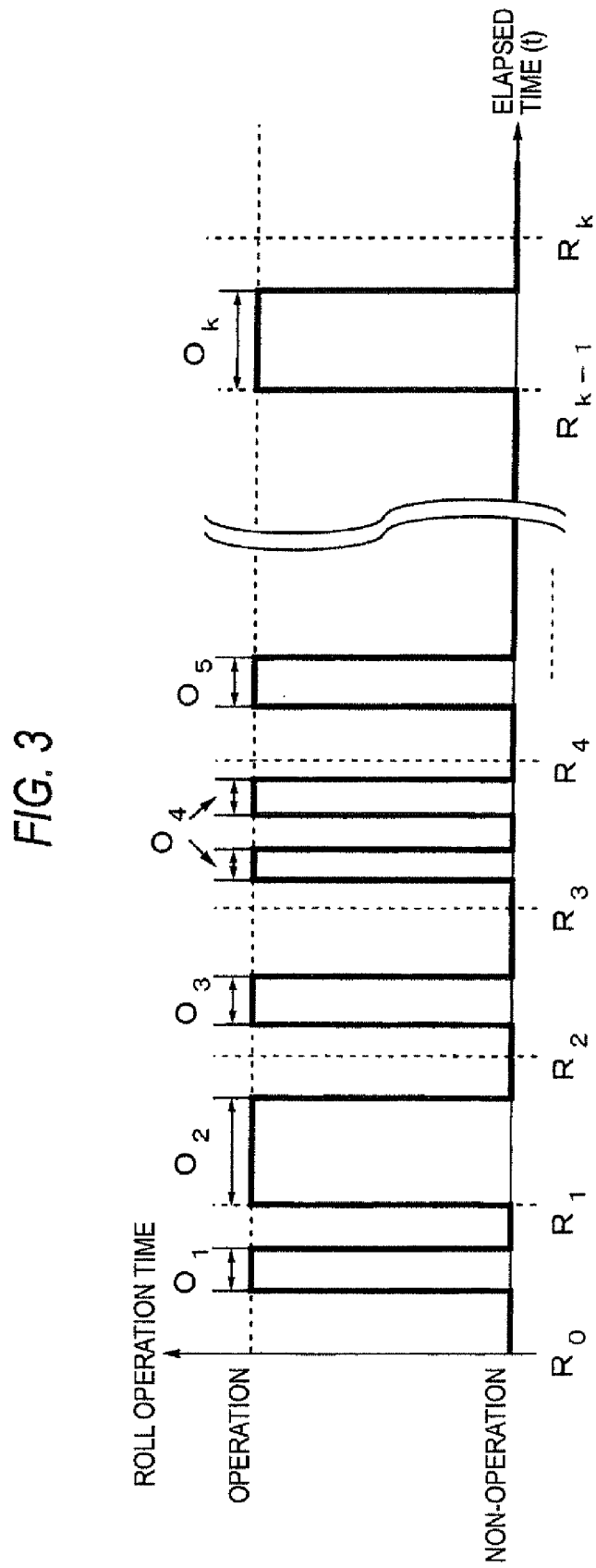
FIG. 3 is a drawing to illustrate a change in a roll operation state accompanying time passage in the prediction system according to the exemplary embodiment of the invention.

Calculation of the roll operation time and the roll non-operation time by the roll operation/non-operation time calculation section 12 in the example will be discussed with reference to FIG. 3. FIG. 3 illustrates a change in the roll operation state accompanying time passage. The horizontal axis is the elapsed time from the reference date and time and the vertical axis is the operation state (operation or non-operation) of the transporting roll. In the example, the reference date and time are set to $R_0$, each point in time for each passage of a measure of time is set to $R_1$, $R_2$, $R_{k-1}$, $R_k$, roll operation time $O_i$, about each time period from $R_{i-1}$ to $R_i$, when i=1 to k is calculated and then is subtracted from the time length of each time period ($=R_i-R_{i-1}$) to calculate roll non-operation time $NO_i$.

The roll operation time $O_i$ in each time period is calculated by integrating the time between the point in time at which the drive start command signal is issued to the drive section of the transporting roll and the point in time at which the drive stop command signal is issued in the time period, for example, (operation time of the transporting roll).

In place of calculating the roll non-operation time $NO_i$ in each time period by subtracting the roll operation time $O_i$ from the time length of each time period ($=R_i-R_{i-1}$), the roll non-operation time $NO_i$ may be calculated by integrating the time between the point in time at which the drive stopt command signal is issued to the drive section of the transporting roll and the point in time at which the drive start command signal is issued in the time period, for example, (stop time of the transporting roll). In this case, the roll non-operation time $NO_i$ may be subtracted from the time length of the time period ($=R_i-R_{i-1}$) to calculate the roll operation time $O_i$.

FIG. 4 illustrates the data collected by the data acquisition section 11 and the roll operation/non-operation time calculation section 12. In the example in FIG. 4, the roll operation time $O_i$, the roll non-operation time $NO_i$ ($=R_i-R_{i-1}-O_i$), and sheet transporting time $T_i$ (where i=1 to k) are collected for each time period of $R_0$ to $R_k$. In the example, the average value of the sheet transporting times measured in the time period from $R_{i-1}$ to $R_i$ is used as the sheet transporting time $T_i$.

The prediction expression creation section 13 creates prediction expression A for calculating a change in the sheet transporting time caused by the wear-based degradation and prediction expression B for calculating a change in the sheet transporting time caused by the time-varying degradation based on the data collected by the data acquisition section 11 and the roll operation/non-operation time calculation section 12, and stores data of the prediction expressions A and B in the prediction expression data storage section 14.

In the example, a stable use frequency less varying depending on the time period is assumed, data is collected while the image forming apparatus is used according to the assumption, and a relational expression between the roll operation time and the sheet transporting time is derived based on the collected data and is adopted as the prediction expression A. While the image forming apparatus is used at a low frequency at which occurrence of the wear-based degradation becomes very small (for example, the number of transported sheets in each time period is one), data is collected and a relational expression between the roll non-operation time and the sheet transporting time is derived based on the collected data and is adopted as the prediction expression B.

The length of each time period may be uniform or may be nonuniform, the length of the time period used to derive the prediction expression A and the length of the time period used to derive the prediction expression B may differ, a sufficient number of samples to derive each of the prediction expressions A and B may be obtained.

It is estimated that the prediction expressions A and B draw monotone increasing curves and thus the expressions are derived according to a technique using a polynomial regression model, etc., for example. The prediction expressions A and B are represented like (Expression 1) as an example.

[Expression 1]

$$y = f(x, w) = \sum_{j=0}^{M} w_j \cdot x^j \quad \text{(Expression 1)}$$

In (Expression 1), M representing the degree is determined using AIC (Akaike's Information Criterion), etc. The response variable y is the sheet transporting time. The independent variable x is the roll operation time in the prediction expression A and is the roll non-operation time in the prediction expression B. The coefficient w is found using an algorithm for finding a regression coefficient, etc., based on data as illustrated in FIG. 4.

Figure 5:
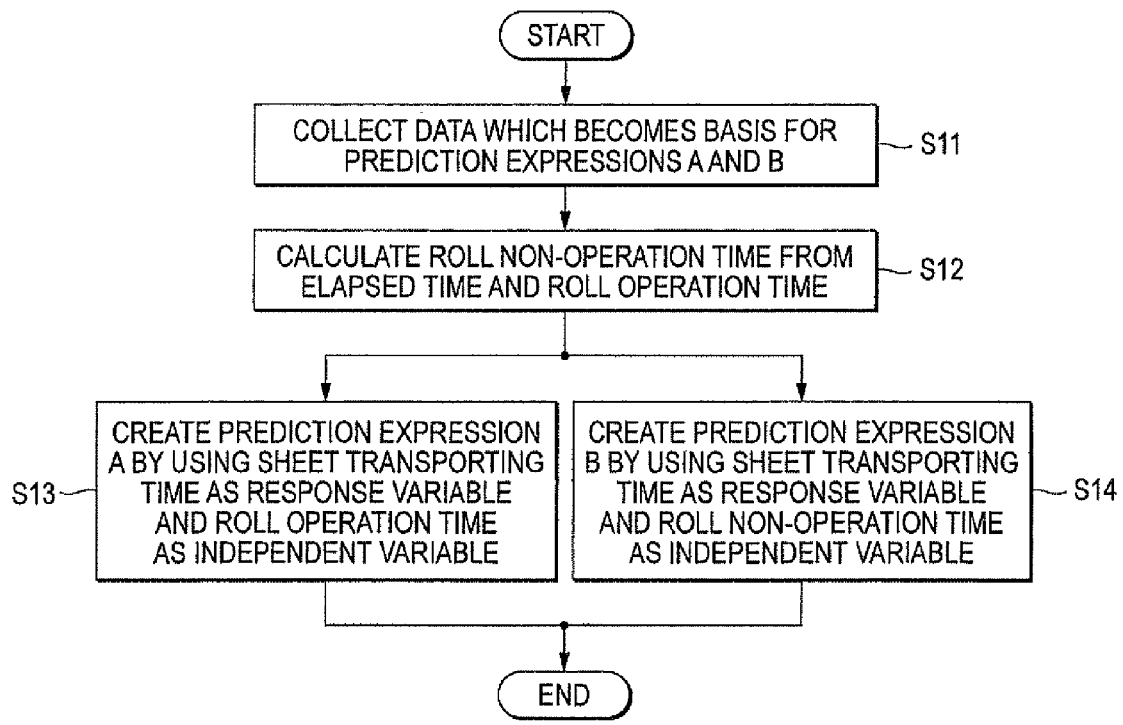
FIG. 5 is a drawing to illustrate a flow of prediction expression creation processing in the prediction system according to the exemplary embodiment of the invention.

FIG. 5 illustrates a flow of prediction expression creation processing executed by the function blocks illustrated in FIG. 1.

In the example, the data acquisition section 11 collects the elapsed time, the sheet transporting time, the operation state data, etc., as data which becomes a basis for creating the prediction expressions A and B (step S11). The roll operation/non-operation time calculation section 12 calculates the roll operation time based on the operation state data and subtracts the roll operation time from the elapsed time to calculate the roll non-operation time (step S12). Then, the prediction expression creation section 13 creates prediction expression A (wear-based sheet transporting time prediction expression) by using the sheet transporting time as the response variable and the roll operation time as the independent variable (step S13) and creates prediction expression B (time-varying sheet transporting time prediction expression) by using the sheet transporting time as the response variable and the roll non-operation time as the independent variable (step S14).

The prediction expressions A and B created as described above are stored in the prediction expression data storage section 14 and are used in the later prediction processing.

Next, the prediction processing in the prediction system according to the exemplary embodiment of the invention will be discussed.

Figure 6:
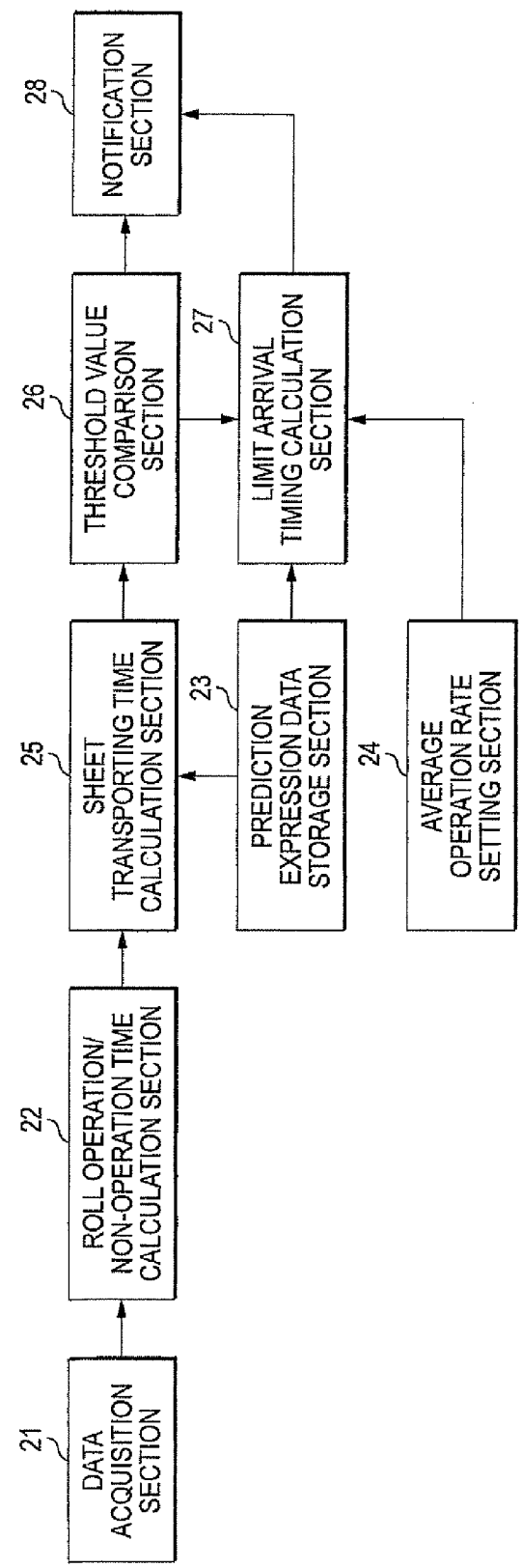
FIG. 6 is a drawing to show an example of function blocks relating to prediction processing in the prediction system according to the exemplary embodiment of the invention.

FIG. 6 shows an example of function blocks relating to the prediction processing. The prediction system in the exemplary embodiment performs the prediction processing by using function sections of a data acquisition section 21, a roll operation/non-operation time calculation section 22, a prediction expression data storage section 23, an average operation rate setting section 24, a sheet transporting time calculation section 25, a threshold value comparison section 26, a limit arrival timing calculation section 27, a notification section 28, etc.

The data acquisition section 21 acquires data which becomes a basis of prediction based on the prediction expressions A and B from the image forming apparatus installed in the actual use environment. In the example, like the data acquisition section 11, the data acquisition section 21 acquires the elapsed time from the reference date and time, the operation state data indicating the operation state (operation or non-operation) of the transporting roll, etc.

Like the roll operation/non-operation time calculation section 12, the roll operation/non-operation time calculation section 22 calculates the operation time of the transporting roll (roll operation time) and the non-operation time of the transporting roll (roll non-operation time) based on the data acquired by the data acquisition section 21. In the example, the cumulative value of the roll operation time and the cumulative value of the roll non-operation time from the reference date and time to the current point in time (the point in time at which the prediction processing is performed) rather than the roll operation time and the roll non-operation time in each of the time periods are calculated.

The prediction expression data storage section 23 stores data of the prediction expression A (wear-based sheet transporting time prediction expression) and the prediction expression B (time-varying sheet transporting time prediction expression) created by performing the prediction expression creation processing.

The average operation rate setting section 24 stores data concerning the preset average operation rate of the transporting roll (percentage of the roll operation time in the unit time (for example, a day), assumes that the average operation rate is the future average operation rate, and gives the rate to the limit arrival timing calculation section 27. As an example of the data concerning the average operation rate, data of operation schedule of the image forming unit (for example, use schedule of five hours per day) is stored and the average operation rate of the transporting roll is calculated based on the operation schedule, but the average operation rate itself of the transporting roll may be stored.

For example, if it is assumed that the transporting roll is operated for five hours per day, the average operation rate is calculated as follows and is stored in the average operation rate setting section 24:

Average operation rate=five hours/24 hours=0.208

The sheet transporting time calculation section 25 calculates the sheet transporting time at the current point in time using the roll operation time and the roll non-operation time calculated by the roll operation/non-operation time calculation section 22 and the data of the prediction expressions A and B stored in the prediction expression data storage section 23.

In the example, the sheet transporting time calculated from the prediction expression A about the roll operation time up to the current point in time (cumulative value) and the sheet transporting time calculated from the prediction expression B about the roll non-operation time up to the current point in time (cumulative value) are added and the sheet transporting time at the current point in time is calculated.

Figure 7:
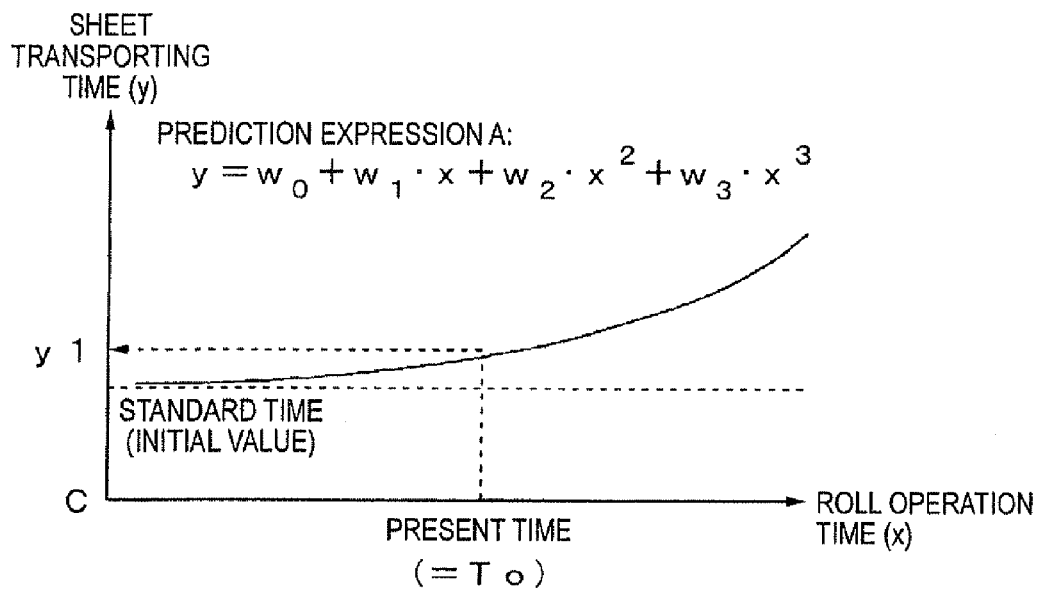
FIG. 7 is a drawing to illustrate a predication curve based on prediction expression A (wear-based sheet transporting time prediction expression) in the prediction system according to the exemplary embodiment of the invention.

FIG. 7 illustrates a predication curve based on the prediction expression A (wear-based sheet transporting time prediction expression). The horizontal axis is the roll operation time representing the operation time of the transporting roll, and the vertical axis is the sheet transporting time predicted based on the prediction expression A from the roll operation time. (Expression 2) is used as the expression A.

[Expression 2]

$$y = w_0 + w_1 \cdot x + w_2 \cdot x^2 + w_3 \cdot x^3 \quad \text{(Expression 2)}$$

Figure 8:
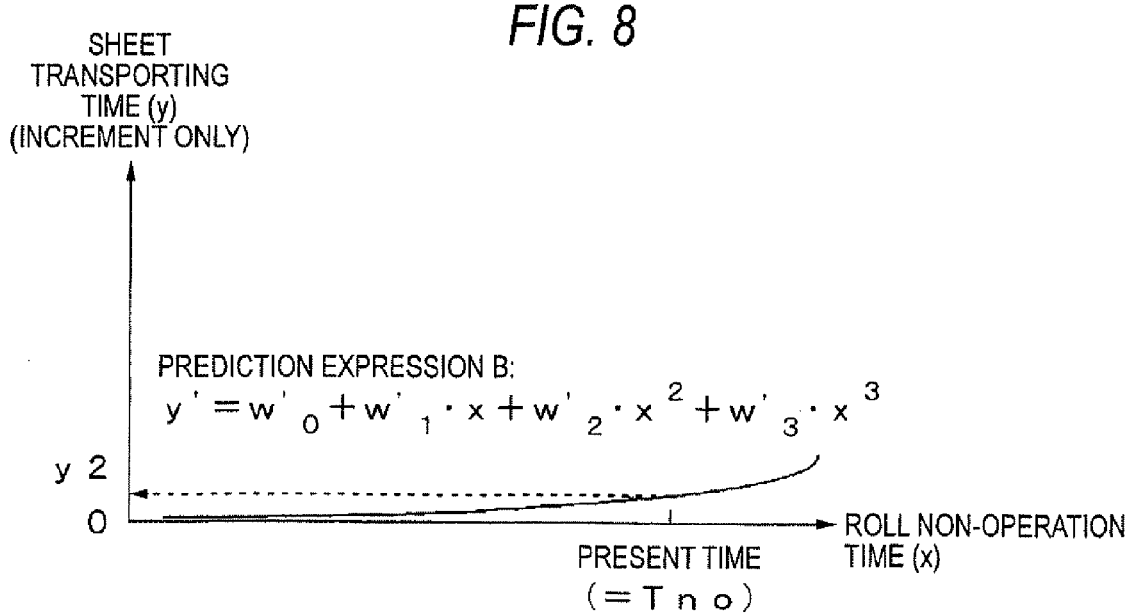
FIG. 8 is a drawing to illustrate a predication curve based on prediction expression B (time-varying sheet transporting time prediction expression) in the prediction system according to the exemplary embodiment of the invention.

FIG. 8 illustrates a predication curve based on the prediction expression B (time-varying sheet transporting time prediction expression). The horizontal axis is the roll non-operation time representing the non-operation time of the transporting roll, and the vertical axis is the sheet transporting time predicted based on the prediction expression B from the roll non-operation time. (Expression 3) is used as the expression B.

[Expression 3]

$$y' = w_0' + w_1' \cdot x + w_2' \cdot x^2 + w_3' \cdot x^3 \quad \text{(Expression 3)}$$

Figure 9:
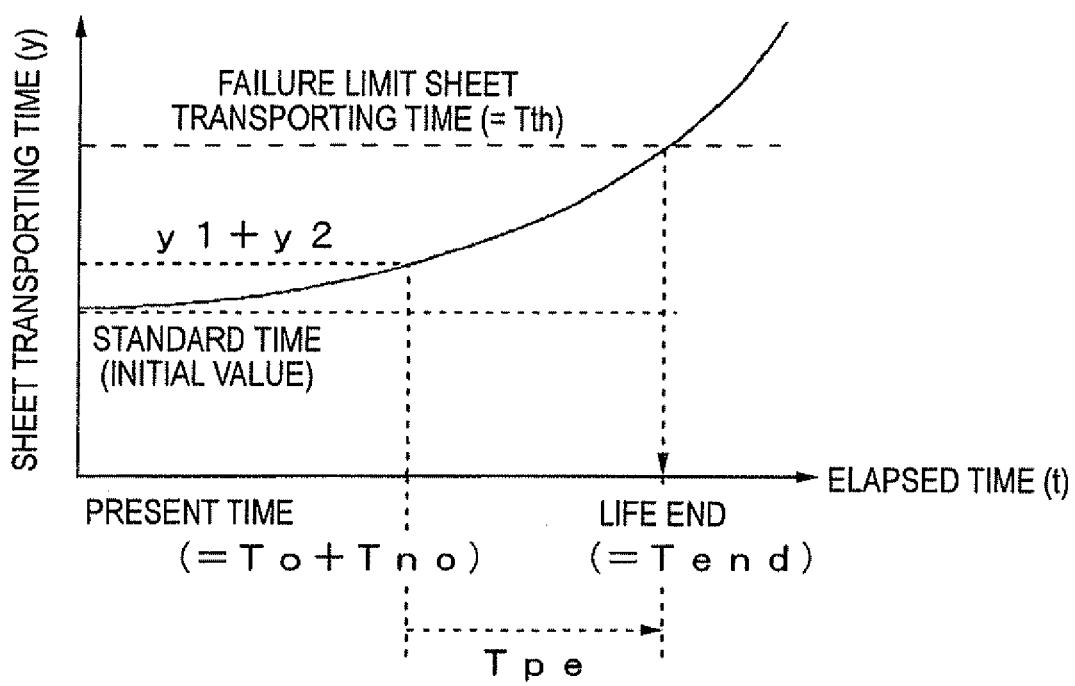
FIG. 9 is a drawing to illustrate the relationship between the sheet transporting time predicted based on the prediction expressions A and B and the elapsed time in the prediction system according to the exemplary embodiment of the invention.

FIG. 9 illustrates the relationship between the sheet transporting time predicted based on the prediction expressions A and B and the elapsed time. The horizontal axis is the elapsed time from the reference date and time, and the vertical axis is the sheet transporting time predicted based on the prediction expressions A and B from the elapsed time.

As shown in FIGS. 7 to 9, in the example, sheet transporting time y1 responsive to the wear-based degradation is calculated based on the roll operation time (To) from the reference date and time to the current point in time, sheet transporting time y2 responsive to the time-varying degradation is calculated based on the roll non-operation time (Tno) from the reference date and time to the current point in time, and they are added, thereby calculating the sheet transporting time (=y1+y2) at the current point in time (=To+Tno).

The threshold value comparison section 26 compares the sheet transporting time up to the current point in time calculated by the sheet transporting time calculation section 25 with a threshold value for determining the life end. If the sheet transporting time up to the current point in time reaches the threshold value (is equal to or larger than the threshold value), the threshold value comparison section 26 determines that the transporting roll reaches the life end, and outputs a command of notification indicating that the transporting roll reaches the life end to the notification section 28. In the example in FIG. 9, the failure limit sheet transporting time (=Tth) is used as the threshold value for determining the life end.

If the threshold value comparison section 26 does not determine that the transporting roll reaches the life end (if the sheet transporting time up to the current point in time does not reach the threshold value), the limit arrival timing calculation section 27 calculates the limit arrival timing at which it is predicted that the transporting roll will reach the life end using the roll operation time and the roll non-operation time up to the current point in time calculated by the roll operation/non-operation time calculation section 22, the data of the prediction expressions A and B stored in the prediction expression data storage section 23, and the future average operation rate of the transporting roll given from the average operation rate setting section 24, and outputs a command of notification concerning the calculation result to the notification section 28.

In the example, the time length from the current point in time (=To+Tno) to the limit arrival timing (=Tend) is Tpe and the limit arrival timing is calculated as follows:

Given information is the roll operation time To up to the current point in time, the roll non-operation time Tno up to the current point in time, the prediction expression A of the wear-based sheet transporting time prediction expression, the prediction expression B of the time-varying sheet transporting time prediction expression, and the roll operation rate from the current point in time to the limit arrival timing (future average operation rate) $\epsilon$. The prediction expression A is y=f(x) (where x is the roll operation time), the prediction expression B is y'=f'(x) (where x is the roll non-operation time), and the sheet transporting time which becomes the life end (threshold value for determining the life end) is the failure limit sheet transporting time Tth.

The timing at which the adding result of the sheet transporting time calculated from the prediction expression A and the sheet transporting time calculated from the prediction expression B becomes the failure limit sheet transporting time Tth is the limit arrival timing and thus equality of f(To+Tpe*$\epsilon$)+f'(Tno+Tpe*(1−$\epsilon$))=Tth holds true.

Since the time length from the current point in time to the limit arrival timing, Tpe=Tend−(To+Tno), calculation expressions of the roll operation time from the current point in time to the limit arrival timing, Tpe*$\epsilon$=(Tend−(To+Tno))*$\epsilon$, and the roll non-operation time from the current point in time to the limit arrival timing, Tpe*(1−$\epsilon$)=(Tend−(To+Tno))*(1−$\epsilon$) are derived.

The calculation expressions (calculation expressions of the roll operation time and the roll non-operation time) are assigned to the equality and calculation about Tend is performed, whereby the limit arrival timing may be found.

The notification section 28 outputs notification responsive to the command given from the threshold value comparison section 26 or the limit arrival timing calculation section 27. Various output techniques of notification are available; for example, output techniques of display on a display section provided in the image forming apparatus, print on a medium of a sheet, etc., by the function of the image forming apparatus, mail transmission to the previously specified destination, and the like may be named.

In the example, the sheet transporting time calculation section 25 calculates the sheet transporting time at the current point in time, the threshold value comparison section 26 makes a determination about the sheet transporting time, and if it is not determined that the transporting roll does not reach the life end, the limit arrival timing calculation section 27 calculates the limit arrival timing. However, the limit arrival timing may be calculated without calculating or determining the sheet transporting time at the current point in time. In this case, the limit arrival timing of the calculation result may be compared with the elapsed time up to the current point in time and if the elapsed time exceeds the limit arrival timing, it may be determined that the transporting roll reaches the life end.

In the example, a command of notification concerning the calculation result of the limit arrival timing calculation section 27 is unconditionally output to the notification section 28. However, for example, when the time length from the current point in time to the limit arrival timing becomes equal to or less than a preset time length, a command of notification concerning the calculation result may be output from the limit arrival timing calculation section 27 to the notification section 28. Accordingly, notification when there is a time margin to the limit arrival timing is suppressed.

Figure 10:
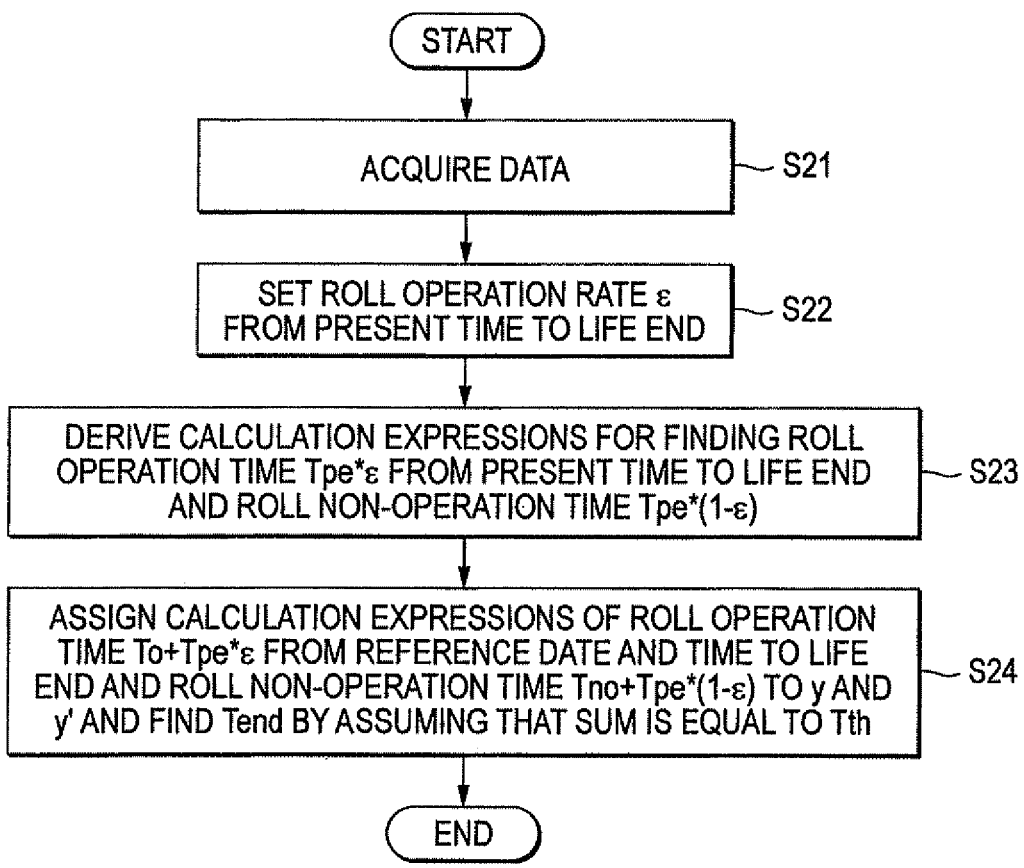
FIG. 10 is a drawing to show an example of a flow of prediction processing in the prediction system according to the exemplary embodiment of the invention.

FIG. 10 shows an example of a flow of prediction processing executed by the function blocks illustrated in FIG. 6. This flow is an example of the case where the limit arrival timing is calculated without calculating or determining the sheet transporting time at the current point in time.

The data acquisition section 21 collects the elapsed time, the operation state data, etc., as data which becomes a basis of prediction based on prediction expressions A and B, and the roll operation/non-operation time calculation section 22 calculates the roll operation time up to the current point in time based on the operation state data, etc., and subtracts the roll operation time from the elapsed time up to the current point in time to calculate the roll non-operation time up to the current point in time (step S21). The average operation rate setting section 24 sets roll operation rate c assumed from the current point in time to the life end based on data concerning the preset average operation rate of the transporting roll in the limit arrival timing calculation section 27 (step S22). Then, the limit arrival timing calculation section 27 derives calculation expressions for finding the roll operation time Tpe*ϵ from the current point in time to the limit arrival timing and the roll non-operation time Tpe*(1−ϵ) from the current point in time to the limit arrival timing (step S23), assigns calculation expressions of roll operation time To+Tpe*ϵ from the reference date and time to the life end and the roll non-operation time Tno+Tpe*(1−ϵ) to prediction expression A (y=f(x)) and prediction expression B (y'=f'(x)), and finds the limit arrival timing Tend by assuming that the sum is equal to the failure limit sheet transporting time Tth (step S24).

Figure 11:
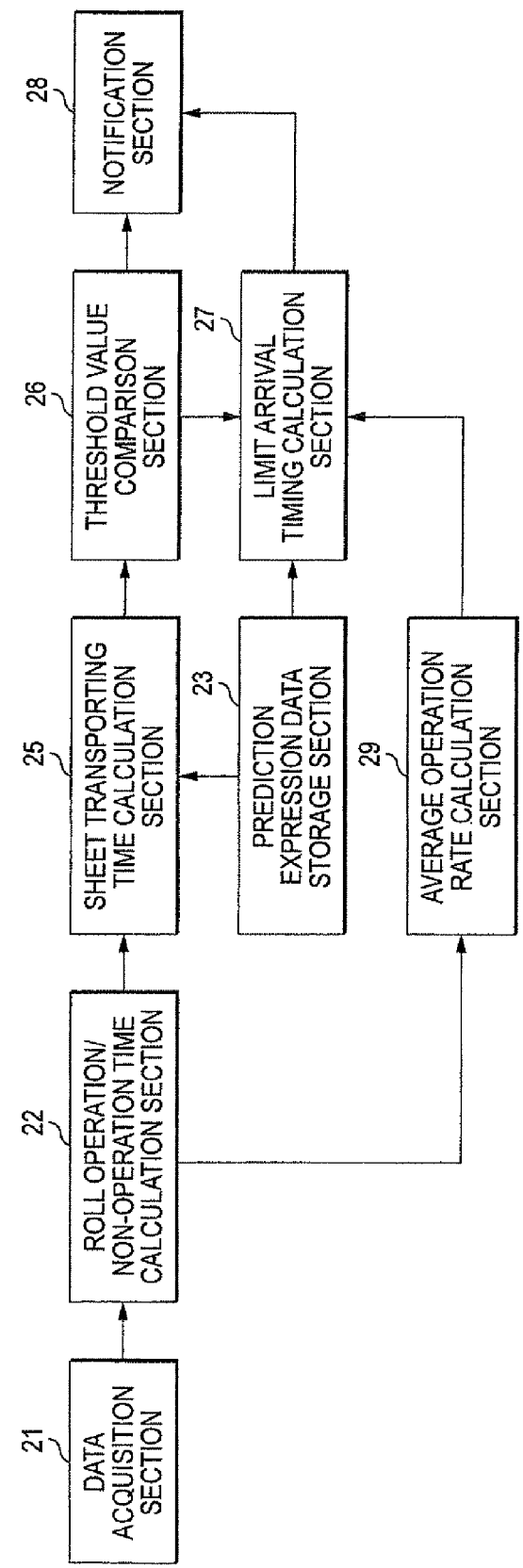
FIG. 11 is a drawing to show another example of function blocks relating to prediction processing in a prediction system according to the exemplary embodiment of the invention.

FIG. 11 shows another example of function blocks relating to the prediction processing. A prediction system in the example performs the prediction processing using function blocks of a data acquisition section 21, a roll operation/non-operation time calculation section 22, a prediction expression data storage section 23, an average operation rate setting section 29, a sheet transporting time calculation section 25, a threshold value comparison section 26, a limit arrival timing calculation section 27, a notification section 28, etc.

In the example in FIG. 11, the average operation rate setting section 24 in FIG. 6 is replaced with the average operation rate setting section 29 and other function blocks perform the same operation those in FIG. 6 and will not be discussed again.

The average operation rate setting section 29 calculates the past average operation rate of the transporting roll (percentage of the roll operation time in the unit time (for example, a day) based on the roll operation time and the roll non-operation time calculated by the roll operation/non-operation time calculation section 22. This average operation rate is used as the average roll operation rate from the current point in time to the life end. That is, in the example, it is assumed that the image forming apparatus will be used at a similar use frequency to the use frequency of the image forming unit so far and the average operation rate up to the current point in time is assumed to be the future average operation rate and is given to the limit arrival timing calculation section 27 for calculating the limit arrival timing.

For example, if the number of days from installing (manufacturing) of the transporting roll to the current point in time is 90 and the total operation time of the transporting roll is 450 hours, the average operation rate is calculated as follows:

Average operation rate=roll operation time/(roll operation time+roll non-operation time)=roll operation time/(total time from installing (manufacturing) of the transporting roll to the present time)=450 hours/(90 days*24 hours)=0.208

Figure 12:
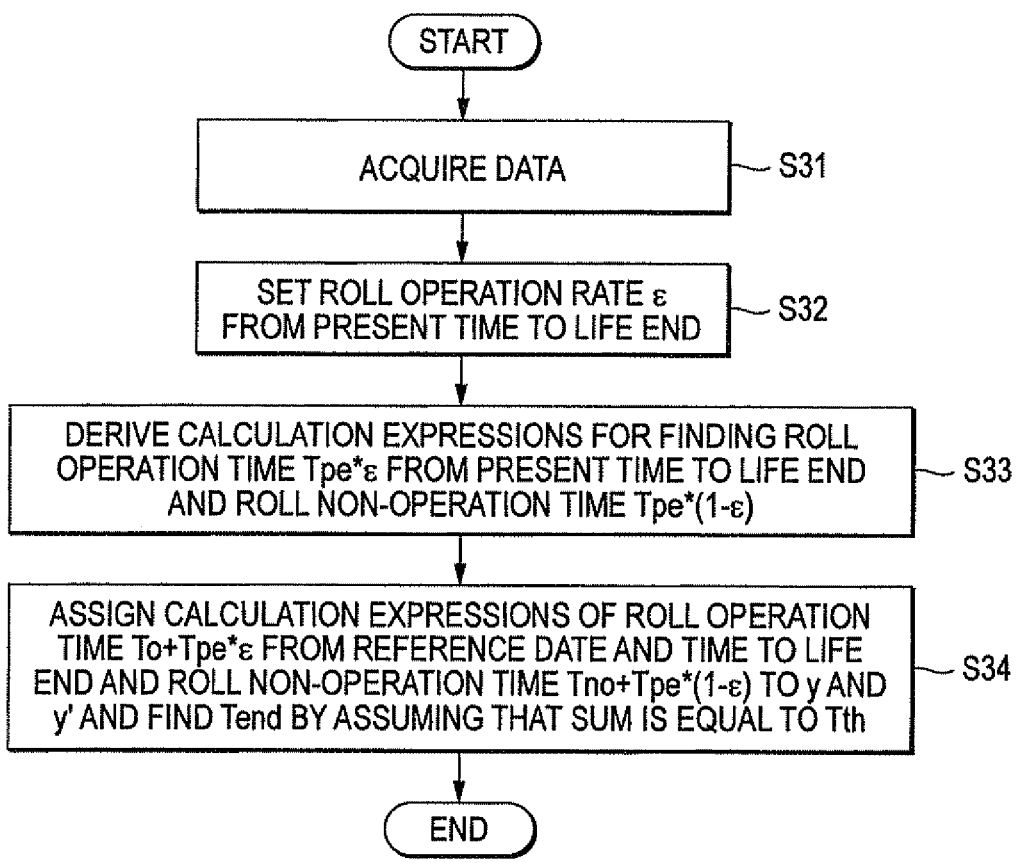
FIG. 12 is a drawing to show another example of a flow of prediction processing in the prediction system according to the exemplary embodiment of the invention.
Figure 13:
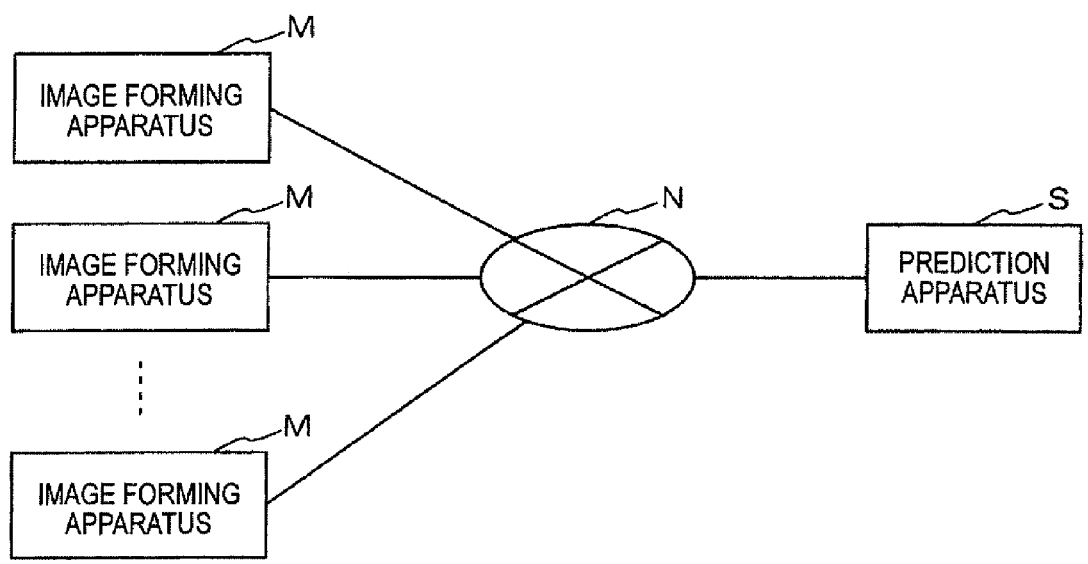
FIG. 13 is a drawing to show an example of making up the prediction system according to the exemplary embodiment of the invention using a prediction apparatus and plural of image forming apparatus.

FIG. 12 shows an example of a flow of prediction processing executed by the function blocks illustrated in FIG. 11. This flow is an example of the case where the limit arrival timing is calculated without calculating or determining the sheet transporting time at the current point in time.

The data acquisition section 21 collects the elapsed time, the operation state data, etc., as data which becomes a basis of prediction based on the prediction expressions A and B, and the roll operation/non-operation time calculation section 22 calculates the roll operation time up to the current point in time based on the operation state data, etc., and subtracts the roll operation time from the elapsed time up to the current point in time to calculate the roll non-operation time up to the current point in time (step S31). The average operation rate setting section 29 calculates the past average operation rate of the transporting roll based on the roll operation time and the roll non-operation time up to the current point in time and sets the rate in the limit arrival timing calculation section 27 as roll operation rate ϵ assumed from the current point in time to the life end (step S32). Then, the limit arrival timing calculation section 27 derives calculation expressions for finding the roll operation time Tpe*ϵ from the current point in time to the limit arrival timing and the roll non-operation time Tpe*(1−ϵ) from the current point in time to the limit arrival timing (step S33), assigns calculation expressions of roll operation time To+Tpe*ϵ from the reference date and time to the life end and the roll non-operation time Tno+Tpe*(1−ϵ) to prediction expression A (y=f(x)) and prediction expression B (y'=f'(x)), and finds the limit arrival timing Tend by assuming that the sum is equal to the failure limit sheet transporting time Tth (step S34).

As described above, in the example, the relational expression between the roll operation time and the sheet transporting time responsive to the wear-based degradation is the prediction expression A (wear-based sheet transporting time prediction expression), the relational expression between the roll non-operation time and the sheet transporting time responsive to the time-varying degradation is the prediction expression B (time-varying sheet transporting time prediction expression), and these prediction expressions A and B are used to calculate the limit arrival timing at which it is predicted that the transporting roll will reach the life end.

The prediction expressions A and B used in the example are only an example and prediction expressions represented in any other format may be used for prediction.

In the example, the roll operation time is used as the index representing the operation amount of the transporting roll; instead, any other index such as the sheet transporting amount of the transporting roll may be used. As the sheet transporting amount, the number of transported sheets, the run distance on sheets (distance where the transporting roll is in contact with the sheets), etc., may be named. The run distance is found according to various techniques; for example, it may be found by measurement or may be found based on the type of transported sheet and the distance preset for each type of sheet (length in the transporting direction).

To use any index other than the roll operation time as the index representing the operation amount of the transporting roll, similar index may be used about the non-operation amount of the transporting roll. In this case, for example, the corresponding index may be found by converting the non-operation time of the transporting roll using a predetermined conversion expression.

In the example, the sheet transporting time is used as the index representing the transporting capability value (degradation degree) of the transporting roll; instead, any other index such as the sheet transporting distance per unit time (sheet transporting speed) may be used.

In the example, the average operation rate of the transporting roll (percentage of the roll operation time in the unit time) is used as the index representing the ratio between the operation amount and the non-operation amount of the transporting roll; instead, any other index such as the roll operation time (or the roll non-operation time) per unit time may be used.

The function sections 21 to 29 involved in the prediction processing may be configured as a prediction apparatus provided integrally inside or outside the image forming apparatus or may be configured as a separate prediction apparatus from the image forming apparatus (for example, a server that may communicate with the image forming apparatus in a wireless or wired manner) and prediction processing may be performed in remote control. If the function sections are configured as a separate prediction apparatus from the image forming apparatus, data may be individually collected from plural of image forming apparatus and prediction processing may be performed for each of the image forming apparatus.

The prediction apparatus may be placed in a maintenance center, etc., for managing the operation state of the image forming apparatus. The timing of maintenance of the image forming apparatus may be determined based on prediction performed by a remote prediction apparatus. For example, as shown in a configuration example, a prediction apparatus S and plural of image forming apparatus M may be connected by a network N and data collected in each of the image forming apparatus M (data concerning the roll operation time and the roll non-operation time, etc.,) may be transmitted to the prediction apparatus S through the network N for the prediction apparatus S to perform prediction processing for each of the image forming apparatus M.

As an example of maintenance, in replacement of the transporting belt of the image forming apparatus, if the replacement timing is too early, the number of replacement times increases and the replacement is not preferred from the viewpoints of the cost burden of the customer and an environment problem. On the other hand, if replacement too late, a paper jam, etc., occurs, the possibility that inconvenience may be given to the customer becomes high, and an abrupt replacement request is received, whereby the necessity for placement change of maintenance staff, etc., occurs. According to the invention, prediction is performed considering the non-operation amount and the accuracy of the prediction is improved, so that the occurrence frequency of problems described above decreases.

Any other apparatus than the image forming apparatus is adopted as the apparatus to be monitored and prediction about a transporting roll provided in the apparatus may be performed. For example, prediction about a transporting roll for transporting media of a railway ticket, an admission ticket, a meal ticket, etc., issued in a ticket machine may be performed.

Prediction about any other member than components of a transporting system of media may be performed. For example, in a transporting system using a transporting belt, if time-varying degradation and wear-based degradation occur in the transporting belt, prediction about the transporting belt may be performed.

Figure 14:
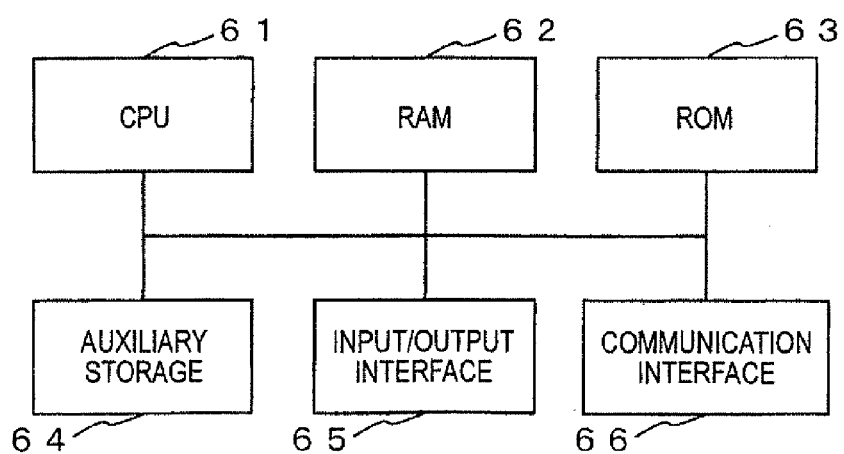
FIG. 14 is a drawing to illustrate the main hardware configuration of a computer operating as the prediction apparatus in the prediction system according to the exemplary embodiment of the invention.

FIG. 14 illustrates the main hardware configuration of a computer operating as the prediction apparatus in the prediction system in the example.

In the example, the prediction apparatus is implemented as a computer having hardware resources of a CPU (Central Processing Unit) 61, main memory of RAM (Random Access Memory) used as a work area of the CPU 61, ROM (Read-Only Memory) recording a basic control program, etc., auxiliary storage for storing programs and various pieces of data according to the exemplary embodiment of the invention (for example, a magnetic disk of an HDD (Hard Disk Drive), etc., rewritable nonvolatile memory of flash memory, etc.,) 64, an input/output I/F 65 of an interface with a display for displaying various pieces of information and an input unit of operation buttons, a touch panel, etc., used for input/output operation by the operator, a communication I/F 66 of an interface for communicating with other devices in a wired or wireless manner, and the like.

The program according to the exemplary embodiment of the invention is read from the auxiliary storage 64, is expanded in the RAM 62, and is executed by the CPU 61, whereby the functions of the prediction apparatus according to the exemplary embodiment of the invention are realized on the computer.

In the example, the function sections of the prediction apparatus are provided in one computer, but may be distributed to plural of computers.

The computer readable medium according to the exemplary embodiment of the invention is set in the computer according to the example in such a manner that the computer readable medium is read from an external storage medium of a CD-ROM storing the computer readable medium or is received via a communication line, etc., for example.

The exemplary embodiment is not limited to the mode in which the function sections are implemented as software as in the example; the function sections may be implemented as dedicated hardware modules.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A prediction apparatus comprising:
an acquisition unit that acquires, from a transporting unit, an operation time during which the transporting unit is driving and a non-operation time during which the transporting unit is not driving, the transporting unit transporting a sheet-shaped medium and the transporting unit being roll-shaped or belt-shaped; and
a prediction unit that predicts a change of a transporting time, in the future, of the sheet-shaped medium in the transport unit, and predicts a life end of the transporting unit using a change of the transporting time, the life end being determined based on when the transporting time will be equal to or larger than a predetermined value based on both (i) a relational expression between the operation time and the transporting time and (ii) a relational expression between the non-driving time and the transporting time, the transporting time being a time in which the medium transported by the transporting unit passes through a preset interval.

2. The prediction apparatus according to claim 1, wherein the prediction unit assumes that a preset ratio between the operation time and the non-operation time of the transporting unit is a ratio between a future time and non-operation time of the transporting unit, and predicts a timing at which the transporting capability value of the transporting unit arrives at the predetermined value.

3. The prediction apparatus according to claim 1, wherein the prediction unit assumes that a ratio between the operation time and the non-operation time of the transporting unit up to the current point in time acquired by the acquisition unit is a ratio between a future operation time and non-operation time of the transporting unit, and predicts a timing at which the transporting capability value of the transporting unit arrives at the predetermined value.

4. The prediction apparatus according to claim 1 further comprising: an output unit that outputs the prediction result of the prediction unit when the time length up to the timing predicted by the prediction unit becomes equal to or less than a preset time length.

5. The prediction apparatus according to claim 1, wherein both of (i) the relational expression between the operation time and the transporting time and (ii) the relational expression between the non-operation time and the transporting time, are derived according to a technique using a polynomial regression model.

6. The prediction apparatus according to claim 1, wherein (i) the relational expression between the operation time and the transporting time is:

$$y = \sum_{j=0}^{M} w_j \cdot x^j;$$

and (ii) the relational expression between the non-operation time and the transporting time is:

$$y = \sum_{j=0}^{M} w'_j \cdot x'^j;$$

wherein M represents the degree, y is the transporting time, x is the operation time, x' is the non-operation time, and w and w' are coefficients.

7. A prediction system comprising:
a monitor target apparatus; and
a prediction apparatus connected to the monitor target apparatus through a network, wherein
the monitor target apparatus comprises a transporting unit that transports a medium, and
the prediction apparatus comprises:
an acquisition unit that acquires an operation time during which the transporting unit is driving and a non-operation time during which the transporting unit is not driving, the transporting unit transporting a sheet-shaped medium and the transporting unit being roll-shaped or belt-shaped, the prediction apparatus acquiring the operation time and the non-operation times from the monitor target apparatus through the network; and
a prediction unit that predicts a change of a transporting time, in the future, of the sheet-shaped medium in the transport unit, and predicts a life end of the transporting unit using a change of the transporting time, the life end being determined based on when a transporting time will be equal to or larger than a predetermined value based on both (i) a relational expression between the operation time and the transporting time and (ii) a relational expression between the non-operation time and the transporting time, the transporting time being a time in which the medium transported by the transporting unit passes through a preset interval.

8. The prediction system according to claim 7, wherein the prediction unit assumes that a preset ratio between the operation time and the non-operation time of the transporting unit is a ratio between a future operation time and non-operation time of the transporting unit, and predicts a timing at which the transporting capability value of the transporting unit arrives at the predetermined value.

9. The prediction system according to claim 7, wherein the prediction unit assumes that a ratio between the operation time and the non-operation time of the transporting unit up to the current point in time acquired by the acquisition unit is a ratio between a future operation time and non-operation time of the transporting unit, and predicts a timing at which the transporting capability value of the transporting unit arrives at the predetermined value.

10. The prediction system according to claim 7 further comprising: an output unit that outputs the prediction result of the prediction unit when the time length up to the timing predicted by the prediction unit becomes equal to or less than a preset time length.

11. An image forming apparatus comprising:
an image forming unit that forms an image on a medium;
a transporting unit that transports a medium on which an image is to be formed;
an acquisition unit that acquires, from a transporting unit, an operation time during which the transporting unit is driving and a non-operation time during which the transporting unit is not driving, the transporting unit transporting a sheet-shaped medium and the transporting unit being roll-shaped or belt-shaped; and a prediction unit that predicts a change of a transporting time, in the future, of the sheet-shaped medium in the transport unit, and predicts a life end of the transporting unit using a change of the transporting time, the life end being determined based on when a transporting time will be equal to or larger than a predetermined value based on both (i) a relational expression between the operation time and the transporting time and (ii) a relational expression between the non-operation time and the transporting time, the transporting time being a time in which the medium transported by the transporting unit passes through a preset interval.

12. The image forming apparatus according to claim 11, wherein the prediction unit assumes that a preset ratio between the operation time and the non-operation time of the transporting unit is a ratio between a future operation time and non-operation time of the transporting unit, and predicts a timing at which the transporting capability value of the transporting unit arrives at the predetermined value.

13. The image forming apparatus according to claim 11, wherein the prediction unit assumes that a ratio between the operation time and the non-operation time of the transporting unit up to the current point in time acquired by the acquisition unit is a ratio between a future operation time and non-operation time of the transporting unit, and predicts a timing at which the transporting capability value of the transporting unit arrives at the predetermined value.

14. The image forming apparatus according to claim 11 further comprising: an output unit that outputs the prediction result of the prediction unit when the time length up to the timing predicted by the prediction unit becomes equal to or less than a preset time length.

15. A medium transporter comprising:
a transporting unit that transports a medium on which an image is to be formed;
an acquisition unit that acquires, from a transporting unit, an operation time that the transporting unit is driving and a non-operation time that the transporting unit is not driving, the transporting unit transporting a sheet-shaped medium and the transporting unit being roll-shaped or belt-shaped; and
a prediction unit that predicts a change of a transporting time, in the future, of the sheet-shaped medium in the transport unit, and predicts a life end of the transporting unit using a change of the transporting time, the life end being determined based on when a transporting time will be equal to or larger than a predetermined value based on both (i) a relational expression between the operation time and the transporting time and (ii) a relational expression between the non-operation time and the transporting time, the transporting time being a time in which the medium transported by the transporting unit passes through a preset interval.

16. The medium transporter according to claim 15, wherein the prediction unit assumes that a preset ratio between the operation time and the non-operation time of the transporting unit is a ratio between a future operation time and non-operation time of the transporting unit, and predicts a timing at which the transporting capability value of the transporting unit arrives at the predetermined value.

17. The medium transporter according to claim 15, wherein the prediction unit assumes that a ratio between the operation time and the non-operation time of the transporting unit up to the current point in time acquired by the acquisition unit is a ratio between a future operation time and non-operation time of the transporting unit, and predicts a timing at which the transporting capability value of the transporting unit arrives at the predetermined value.

18. A non-transitory computer readable medium storing a computer readable program executable by a computer for causing a computer to execute a process for predicting a timing, the process comprising:
acquiring, from a transporting unit, an operation time during which the transporting unit is driving and a non-operation time that the transporting unit is not driving, the transporting unit transporting a sheet-shaped medium and the transporting unit being roll-shaped or belt-shaped; and
predicting a change of a transporting time, in the future, of the sheet-shaped medium in the transport unit, and predicts a life end of the transporting unit using a change of the transporting time, the life end being determined based on when a transporting time will be equal to or larger than a predetermined value based on both (i) a relational expression between the operation time and the transporting time and (ii) a relational expression between the non-operation time and the transporting time, the transporting time being a time in which the medium transported by the transporting unit passes through a preset interval.

19. The non-transitory computer readable medium according to claim 18, wherein the predicting assumes that a preset ratio between the operation time and non-operation time of the transporting is a ratio between a future operation time and the non-operation time of the transporting, and predicts a timing at which the transporting capability value of the transporting arrives at the predetermined value.

20. The non-transitory computer readable medium according to claim 18, wherein the predicting assumes that a ratio between the operation time and the non-operation time of the transporting up to the current point in time acquired by the acquiring is a ratio between a future operation time and non-operation time of the transporting, and predicts a timing at which the transporting capability value of the transporting arrives at the predetermined value.

* * * * *